(12) United States Patent
Donadello et al.

(10) Patent No.: US 12,214,441 B2
(45) Date of Patent: Feb. 4, 2025

(54) METHOD AND SYSTEM FOR DETERMINING THE LOCAL POSITION OF AT LEAST ONE OPTICAL ELEMENT IN A MACHINE FOR LASER PROCESSING OF A MATERIAL, USING LOW-COHERENCE OPTICAL INTERFEROMETRY TECHNIQUES

(71) Applicant: ADIGE S.P.A., Levico Terme (IT)

(72) Inventors: Simone Donadello, Rodigo (IT); Barbara Previtali, Milan (IT); Daniele Colombo, Renate (IT)

(73) Assignee: ADIGE S.P.A., Levico Terme (IT)

( * ) Notice: Subject to any disclaimer, the term of this patent is extended or adjusted under 35 U.S.C. 154(b) by 227 days.

(21) Appl. No.: 17/781,594

(22) PCT Filed: Dec. 4, 2020

(86) PCT No.: PCT/IB2020/061507
§ 371 (c)(1),
(2) Date: Jun. 1, 2022

(87) PCT Pub. No.: WO2021/111393
PCT Pub. Date: Jun. 10, 2021

(65) Prior Publication Data
US 2022/0410309 A1    Dec. 29, 2022

(30) Foreign Application Priority Data
Dec. 6, 2019    (IT) .................. 102019000023214

(51) Int. Cl.
*B23K 26/046*    (2014.01)
*G01B 9/02055*    (2022.01)
*G01B 9/0209*    (2022.01)

(52) U.S. Cl.
CPC ........ *B23K 26/046* (2013.01); *G01B 9/02072* (2013.04); *G01B 9/0209* (2013.01)

(58) Field of Classification Search
CPC ............ G01B 9/02032; G01B 9/02072; G01B 9/0209; G01B 9/02091; B23K 26/032; B23K 26/046; B23K 26/707
See application file for complete search history.

(56) References Cited

U.S. PATENT DOCUMENTS 11,925,999 B2 * 3/2024 Hermani .............. B23K 26/044
2016/0059347 A1 * 3/2016 Kogel-Hollacher ........................ B23K 26/082
219/121.73

(Continued)

FOREIGN PATENT DOCUMENTS

DE    102018105877 B3    2/2019
WO    2010092533 A1    8/2010

OTHER PUBLICATIONS

English translation of DE 10 2018 105877. Acquired from Espacenet on Mar. 14, 2024. (Year: 2024).*

(Continued)

*Primary Examiner* — Michael A Lyons
(74) *Attorney, Agent, or Firm* — ArentFox Schiff LLP; Michael Fainberg

(57) ABSTRACT

A method for determining local position of an optical element associated with an optical path for transporting a laser beam in a working head of a machine for laser processing a material, includes generating a measurement beam of low coherence optical radiation traveling a measurement optical path, leading the measurement beam towards the optical element and the reflected or diffused measurement beam towards an optical interferometric sensor arrangement, generating a reference beam of low coherence optical radiation traveling a reference optical path and (Continued)

leading the reference beam towards the interferometric optical sensor arrangement, superimposing the measurement and reference beams on a common region of incidence, detecting a position of a pattern of interference fringes between the measurement and reference beams, and determining a difference in optical length between the measurement and reference optical paths as a function of the position of the interference pattern along an illumination axis, or of the frequency of the interference pattern in the frequency domain.

17 Claims, 9 Drawing Sheets

(56) References Cited

U.S. PATENT DOCUMENTS

| | | |
|---|---|---|
| 2016/0059350 A1 | 3/2016 | Schönleber et al. |
| 2020/0198051 A1* | 6/2020 | Sauer .................... B23K 26/042 |
| 2020/0406393 A1* | 12/2020 | Blazquez Sanchez ...................... B23K 26/0869 |
| 2022/0357150 A1* | 11/2022 | Stambke ............ G01B 9/02091 |

OTHER PUBLICATIONS

International Search Report, issued in PCT/IB2020/061507, mailed May 11, 2021, Rijswijk, NL.

* cited by examiner

METHOD AND SYSTEM FOR DETERMINING THE LOCAL POSITION OF AT LEAST ONE OPTICAL ELEMENT IN A MACHINE FOR LASER PROCESSING OF A MATERIAL, USING LOW-COHERENCE OPTICAL INTERFEROMETRY TECHNIQUES

CROSS-REFERENCE TO RELATED APPLICATIONS

This application is a National Phase Application of PCT International Application No. PCT/IB2020/061507, having an International Filing Date of Dec. 4, 2020 which claims priority to Italian Application No. 102019000023214 filed Dec. 6, 2019, each of which is hereby incorporated by reference in its entirety.

FIELD OF THE INVENTION

The present invention relates to the laser processing of a material, preferably a metallic material, and specifically improvements in the control of the laser processing of a material, for example for the laser cutting, drilling or welding of said material, or the additive manufacturing of predetermined structures of said material.

More specifically, the invention relates to a method and a system for determining the local position of at least one optical element associated with an optical path for transporting a laser beam in a working head of a machine for laser processing of a material.

According to a further aspect, the present invention relates to a machine for laser processing of a material, comprising a system for determining the position of at least one optical element associated with an optical path for transporting the laser beam designed to implement the aforementioned method.

Further aspects of the invention relate to the determination of the pressure in an assist gas chamber associated with an assist gas flow delivery nozzle carried by a working head of a machine for laser cutting, drilling or welding of a material, or for the additive manufacture of three-dimensional structures via laser, and the determination of the temperature of an optical element interposed along the optical transport path of a laser beam in a machine for the laser processing of a material, or for the additive manufacture of three-dimensional structures by laser.

In the description and in the claims that follow, the term "material" and, in the preferred embodiment, "metal material" is used to identify any manufactured article, such as a plate or an elongated profile having either a closed cross-section—for example with a hollow circular, rectangular or square shape—or an open cross-section—for example a flat cross-section or a cross-section in the shape of L, C, U, etc. In additive manufacturing, the term material identifies the raw material, generally in powder form, subjected to localized sintering or melting by means of the laser beam.

BACKGROUND OF THE INVENTION

In processes for industrial working of materials, and plates and metal profiles in particular, laser is used as a thermal tool for a wide variety of applications that are dependent on the parameters relating to the interaction between the laser beam and the material being processed, in particular on the energy density per volume of incidence of the laser beam on the material, and on the interaction time interval.

For example, by directing a low density of energy (of the order of tens of W per $mm^2$ of surface) for a prolonged amount of time (in the range of seconds) on a metal material, a hardening process occurs, while, by directing a high density of energy (of the order of tens of MW per $mm^2$ of surface) for a time of femtoseconds or picoseconds on the same metal material, a photoablation process occurs. In the intermediate range of increasing energy density and decreasing processing time, controlling these parameters makes it possible to implement welding, cutting, drilling, engraving, marking processes.

In several processes, including working processes by drilling and cutting, it is necessary to generate a flow of an assist gas in the processing region in which the laser beam interacts with the material, which has mechanical functions of driving the melt, or chemical functions of assisting with combustion, or even technological functions of shielding from the environment surrounding the processing region.

In the field of laser processing of materials, laser cutting, drilling and welding are processes that may be carried out by the same machine, which is able to generate a focused high-power laser beam having a preset transverse power distribution in at least one processing plane of the material, typically a laser beam having a power density of between 1 and 10,000 $kW/mm^2$, and to control the direction and the position of incidence of the beam along the material. The difference between the various types of processing that may be performed on a material is substantially attributable to the power of the laser beam used and to the interaction time between the laser beam and the material subjected to processing.

Laser processing machines according to the prior art are shown in FIGS. 1 and 2.

FIG. 1 schematically shows a machine for industrial $CO_2$ laser processing with an optical path of the laser beam in the air, which includes an emission source 10, such as a $CO_2$ laser generator device, suitable for emitting a single-mode or multimode laser beam B, and a plurality of reflecting mirrors 12a, 12b and 12c adapted to lead the laser beam emitted by the emission source along an optical path for transporting the beam towards a working head indicated as a whole with 14 arranged in proximity to a material WP. The working head 14 comprises an optical system for focusing the laser beam 16, generally consisting of a focusing lens, adapted to focus the laser beam along an optical propagation axis incident on the metal material. A nozzle 18 is arranged downstream of the focusing lens and is crossed by the laser beam directed towards an area of a material processing plane. The nozzle is adapted to direct a flow of an assist gas injected by a corresponding plant (not shown) towards the processing area on the material. Assist gas is used to control the execution of a machining process (drilling or cutting) as well as the achievable processing quality. For example, the assist gas may include oxygen, which promotes an exothermic reaction with a metal such as the oxidation of iron, which generates various types of iron oxides through an exoenergetic reaction, releasing energy in the material which contributes, together with that released by the laser beam, to maintaining a dynamic equilibrium of the process allowing the cutting speed to be increased, or an inert gas such as nitrogen which does not contribute to the melting of the material, but carries out a propulsive function of the melted material itself, protects the material (metal) from undesired oxidation at the edges of the processing profile, protects the working head from any splashes of the melt and may also be used to cool the sides of the groove produced on the material, confining the extent of the thermally altered zone.

FIG. 2 schematically shows a machine for industrial processing with a laser beam launched into an optical fiber. It comprises an emission source 10, such as a laser generator device capable of launching a laser beam into a transport fiber, for example a ytterbium-doped fiber laser, or a direct diode laser, capable of emitting a single-mode or multimode laser beam, and an optical fiber guide 12d adapted to lead the laser beam emitted by the emission source towards the working head 14 arranged in proximity to the material WP. At the working head, the laser beam emerging from the fiber with its own controlled divergence is collimated by a collimating dioptric system 20 and reflected by a back-reflective system 22 before being focused through an optical focusing system 16, generally consisting of a focusing lens, along an optical propagation axis incident on the material WP passing through the emission nozzle 18.

FIG. 3 exemplifies a working head 14 according to the prior art. Reference numeral 30 represents a tubular channel having cylindrical or conical sections within which the laser beam, indicated by B, is transmitted. The laser beam B generated by the emission source 10 and transported to the working head through an optical path in air with multiple reflections or in optical fiber impinges collimated on a reflecting deflector element 32 which deflects the optical propagation axis thereof in a direction of incidence on the material being processed. The optical focusing system 16 is intermediate between the reflecting deflector element 32 and a protective glass 34 arranged downstream, adapted to protect the focusing system from any splashes of the melt, and comprises a lens-holder unit 36 to which mechanical adjustment mechanisms 38 are coupled for calibrating the positioning of the lens transversely to the direction of propagation of the beam (axes X-Y) and in the direction of propagation of the beam (axis Z).

As a first approximation, an ideal laser beam, that is a laser beam ideally collimated in parallel beams, downstream of the optical focusing system is concentrated in a focusing spot of finite size at its waist. Generally, in industrial processing uses, the optimal process condition is reached with a position of the transverse plane corresponding to the waist of the beam precisely defined even by a tenth of a millimeter with respect to the wall of the material where the beam is incident and the wall of the material from where the beam is output.

The power density distribution of a normally collimated laser beam is typically Gaussian shape with rotational symmetry in the case of a single-mode beam, i.e. with power concentrated around the longitudinal axis of the beam (axis Z) and gradually decreasing along a peripheral skirt, or it may be described as the envelope of Gaussian profiles with rotational symmetry in the case of a multimode beam.

The use of single-mode or multimode laser radiation beams which may be described in a first approximation as Gaussian, in the field of high-power laser applications, responds to technological control needs. In fact, a Gaussian beam is easily described by few parameters, and it is easily controllable in its propagation along an optical transport path from an emission source to the head of a working machine because it has the characteristic of propagating without modifying the power distribution, whereby it may be described through a radius value and a divergence value in far-field propagation conditions (in which case a geometric optics approximation may be used). In the near-field propagation conditions of the focused beam, along a processing trajectory where the geometric optics approximation is no longer valid, the beam still maintains the Gaussian shape of the power distribution in each of its cross sections.

On the contrary, a laser beam comprising transverse modes of higher order has a non-Gaussian power distribution. Typically these conditions are obtained through the use of dioptric systems (transmissive optical systems, i.e. lenses) or catoptric systems (reflective optical systems, i.e. mirrors) which modify the shape of the beam starting from a Gaussian distribution.

The control of the direction of propagation or of the forms of distribution of the transversal power of the laser beam other than the Gaussian form and possibly with symmetry different from the rotational one on the material processing area, for example in relation to the controlled distribution of an assist gas or depending on the separation distance between the working head and the material, the processing trajectory to be followed and the type of process to be performed, brings advantages to the working process. For example, the control of the power distribution of a laser beam, possibly with breaking of the rotational symmetry of the beam, may allow the power distribution to be located or expanded where it is needed in relation to the separation distance between the working head and the material and to the processing path.

It is apparent that the control of the direction of propagation and of the focus of the laser beam, the control of the forms of distribution of the transverse power of the laser beam and also the control of the assist gas flow—in the processes that require it—must be precise and repeatable, in order to obtain the indicated advantages. For this reason, it is necessary that the position of the optical elements that are associated with the optical transport path of a laser beam in the working head of a machine (interposed along the optical path or facing or alongside it) is controlled with extreme precision and in real time. Otherwise, there is a risk of focusing the laser power into an undesired processing plane in the thickness of the material and of using an assist gas pressure that—at the surface of the material—is either excessive or insufficient. The position of the optical elements could in fact vary according to the current operating conditions of the machine, but also due to errors in the positioning of the elements by an operator at the time of installation or the presence of construction tolerances and undesired assembly clearances. It is also necessary to check the operating parameters of the machine and of the working head in particular, including the current temperature that affects the areas and the optical elements crossed by the high-power processing laser beam, the pressure of the assist gas, the possible mechanical deformation of the optical elements associated with the optical transport path of the laser beam (fiber, mirrors, lenses) so that these parameters do not deviate from the nominal values, causing uncontrolled variations of the process or influencing the measurement of the process, for example the measurement of the distance of separation of the working head from the material, which must be as accurate as possible in real time to be able to accurately control the movement of the working head and the position of its proximal end with respect to the material, i.e. the position of the laser beam output and the assist gas outflow nozzle in the processes requiring it.

SUMMARY OF THE INVENTION

The present invention aims to provide a method for effectively monitoring, possibly in real time, a laser processing of a material, and in particular the state of the optical components and the operating parameters of a laser processing machine.

In this context, a particular object of the invention is to accurately determine the local position of an optical element associated with the transport optical path of the laser beam in a working head of a machine for laser processing a material.

A further object of the present invention is to provide a method for determining a possible perturbation of an optical measurement related to the components and/or operating conditions of a machine for laser processing of a material, for example due to the influence of process parameters, such as pressure, temperature or mechanical deformations on a physical parameter of a transmission medium within which at least a portion of an optical measuring path extends.

Yet a further object of the present invention is to provide an efficient method for determining the pressure in an assist gas chamber associated with an assist gas flow delivery nozzle carried by a working head of a machine for laser cutting, drilling or welding of a material, or for the additive manufacturing of three-dimensional structures by laser.

Yet a further object of the present invention is to provide an efficient method for determining the temperature of an optical element or a transmission medium interposed along the optical transport path of a processing laser beam in a machine for laser processing a material, or for the additive manufacturing of three-dimensional structures by laser.

According to the present invention, these objects are achieved by a method for determining the local position of at least one optical element as described and claimed herein.

Specific embodiments are also described.

The present invention also relates to a system for determining the local position of at least one optical element.

A further subject of the invention is a machine for laser processing of a material, which comprises a system for determining the position of an optical element, arranged to carry out the aforesaid method.

A further subject of the present invention is a method for determining the pressure in an assist gas chamber associated with a nozzle for supplying an assist gas flow, and a method for determining the temperature of an optical element or a transmission medium.

In summary, the present invention is based on an application of the principles of optical interferometry.

The term "optical interferometry" indicates a plurality of techniques that make use of the phenomenon of the interference between a measurement optical beam and a reference optical beam, which beams are superimposed and generate interference fringes. The theory of optical interferometry in coherent light is well known and is used for the relative comparison between distances, without, however, being able to give univocal absolute measurement information for said distances, for example following a temporary interruption of the optical signal.

This invention is inspired by the consideration that an absolute distance measurement may be carried out in the optical domain by using a low coherence interferometry technique. Low coherence interferometry is a simple technique for measuring distances between a probe and a target with high precision, and is based on the comparison between the distance traveled by a measurement optical beam that propagates from a source to a detector assembly and, in this path, is emitted by the probe and back-reflected by the target, and the distance traveled by a reference optical beam that propagates from the source to the detector assembly across a reference path tuned to the measurement path in a known nominal distance condition between the probe and the target.

In low coherence interferometry, the measurement and reference optical beams are generated by low coherence sources, for example LEDs or super luminescent diodes, and the interference fringes between the above-mentioned beams only appear when the respective optical paths—or lengths of optical paths—correspond, the optical path being defined as the sum of the products between the geometric lengths and the respective refractive indices within each portion along the entire optical path traveled—that is, when the length of the measurement path corresponds to the length of the reference path within the coherence length range. Assuming that the length of the reference path is known, it is possible to derive the length of the measurement path by detecting the presence of the envelope of the interference fringes with a resolution of the order of the coherence length that is typically in the micrometers range (from 5 um to 100 um).

This technique is particularly robust with regard to the optical noise since the light coming from other sources or from the laser processing process itself incoherently adds up to the interferometric signal without altering the pattern of interference fringes. The measurement is applied locally at the point at which the measurement optical beam is directed and is independent from the morphology of the surroundings. It also allows precise absolute distance measurements in a distribution substantially coaxial to laser processing.

Different techniques are known for detecting the pattern of interference fringes, in the time domain, in the frequency domain and in the space domain, respectively. Advantageously, the low coherence interferometry techniques with the detection of the pattern of interference fringes in the space and frequency domain are the most promising and more efficient in terms of operative flexibility compared with the detection in the time domain.

In low coherence interferometry comprising detection in the time domain, the pattern of interference fringes is detected by a photodiode or by an array of photodiodes, or by a similar acquisition screen, by adapting the length of the reference path in order to reach a condition where the lengths of the reference path and of the measurement path correspond except for a tolerance of the order of the coherence length. In this case, the limitation on the range of available measurements is associated with the adaptation of the length of the reference path, which—for example—is carried out by means of the translation of a back-reflecting element that is arranged along the above-mentioned path, it being possible for the translation spatial range of the back-reflecting element of the reference path to be between a few microns up to several millimeters, the size of the range of translation being to the detriment of the actuation speed or of the operational complexity.

Although the technique of detection in the time domain is rather simple to carry out and makes it possible to easily achieve the correspondence between the absolute optical lengths of the measurement path and of the reference path, this is, however, poorly suitable for implementation for applications in which the course of an industrial process is measured in real time. In fact, for a dynamic measurement, the length of the reference path has to be continuously modulated to find the condition in which it corresponds with the length of the current measurement path that causes the appearance of the pattern of interference fringes.

This may be obtained by means of various types of control devices, including refractive index modulators or fast-acting mechanical actuators, for example piezoelectric actuators;

however, these types of devices are rather expensive and very delicate since they have to operate at a much faster actuation speed than the sampling rate for measuring the distance, which is typically above kHz, a condition that often may not be obtained easily, especially in the range of large displacements.

A different detection technique is based on the Fourier transform relationship between the spectral density function and the cross-correlation of the measurement and reference beams, by means of which it is possible to extract the differential distance measurement in real space from the spectral profile of the wavelengths of the two interfering beams. In this way, mechanical actuators are not required to align the length of the reference path with the length of the measurement path. A single spectral acquisition of the superimposed measurement and reference beams is possible using a diffraction grating and a focusing lens downstream thereof for projecting the spectral distribution of the interfering beams on a linear sensor device, for example a video camera. The spectrum of the two interfering beams shows a periodic modulation and the periodicity (frequency) of this modulation in the wavelength space varies with the difference between the optical lengths of the measurement path and of the reference path. An algorithm for calculating the Fourier transform, for example an FFT algorithm, is applied in order to extract the measurement of the signal intensity peak in relation to the difference between the optical paths in real space.

Unlike the low coherence interferometry techniques in the time domain in which a scan of the lengths of the reference path is temporally distributed, and in the frequency domain in which the information for comparing the length of the measurement path and the reference path is encoded in the wavelength space, the low coherence interferometry technique comprising detection in the space domain combines the two previous techniques and makes it possible to directly visualize the outcome of the measurement in real space, rendering possible a rapid acquisition thereof by means of an economical device such as an image sensor, for example a linear sensor.

In the typical embodiment of a low coherence interferometric system with detection in the frequency domain, the measurement beam and the reference beam are superimposed co-linearly along the same direction of incidence towards wavelength-dispersive optical means, such as example a diffraction grating, refraction prisms or similar optical elements for the detection of optical spectra, adapted to separate the frequency components of the overall beam obtained by the superposition of the measurement beam and the reference beam on the common region of incidence of optical interferometric sensor means. In this configuration, the spectrum (the interference fringe pattern) of the two interfering beams exhibits a periodic modulation and the periodicity of the fringe pattern in the wavelength space varies as the spatial variation of the measuring optical path varies with respect to the optical path and its extension in the frequency domain is determined by the coherence length of the low coherence optical radiation. Therefore, the measurement of the difference between the length of the measurement optical path and the length of the reference optical path may be extracted by processing the signals emitted by the sensor means to detect the frequency of the interference pattern between the measurement beam and the reference beam.

In the typical design of a low coherence interferometric system having detection in the space domain, the measurement and reference beams impinge superimposed in the sensor means surface from different directions, and the surface of the sensor means is directly adapted to detect the pattern of interference fringes that arises from this superimposition. In this configuration, a spatial variation in the measurement optical path with respect to the reference optical path is directly displayed on the sensor means as a result of the mutual angle of inclination of the two beams. Therefore, the measurement of the difference between the length of the measurement optical path and the length of the reference optical path may be simply extracted by detecting the position of the pattern of interference fringes on the sensor means, the extension of the pattern of interference fringes in the linear dimension of the sensor means being of the order of the coherence length of the optical radiation of the beams.

In the low coherence interferometry technique comprising detection in the space domain, the length of the optical path of each beam that obliquely impinges on the common region of incidence of the sensor means varies linearly with the position along the illumination axis of the sensor means, therefore the difference between the measurement and reference optical paths also varies linearly. The pattern of interference fringes appears in a specific linear range of the image acquired by the sensor means, which corresponds to the condition in which the optical lengths of the measurement path and the reference path are equal within the coherence length of the optical radiation, while, in the other regions of the sensor means, the beams are incoherently superimposed. By detecting the position of the envelope of the pattern of interference fringes along the linear extension of the sensor means, it is possible to extract the respective length of the measurement path.

This measure is only limited by the conditions in which the envelope of the pattern of interference fringes is obtained within the illumination region of the sensor means, that is within the sensitive region of the photodetector devices that form the sensor means. The measurement interval is determined by the inclination of the beams on the region of incidence, or better by the angle of incidence between them, and—with the same inclination of the beams—by the minimum between the number of photodetectors, or photodetection areas (also referred to as pixels of the sensor means), illuminated by the superimposed beams and the total number of photodetectors of the sensor arrangement, i.e. by the minimum number of areas (pixels) that must be illuminated to demodulate the pattern of the interference fringes with respect to the total number of areas (pixels) available on the sensor means. Under common conditions comprising a sensor arrangement having several thousand photodetectors, a measurement range of several tenths of millimeters may be obtained before the appearance of an aliasing effect of the interference fringes. However, the inventors have demonstrated that the presence of the aliasing effect of the pattern of interference fringes does not limit the measurement but in fact may be used to increase the range of measurable distances. In fact, this system of sub-sampling turns out into an effective demodulation of the fringe pattern at lower spatial frequencies, the demodulation being obtained in an analogic way directly at the level of the photodetectors of the interferometric sensor arrangement without the need to interpose additional elements.

Advantageously, the adoption of an interferometry technique comprising detection in the spatial domain makes it possible to take accurate distance measurements using a static system of measurement and reference optical paths and for each individual acquisition or sampling of the spatial distribution of the optical radiation of the superimposed measurement and reference beams, which impinge on the sensor means. In order to provide a system of this kind, standard optical elements are exclusively necessary, and the signals emitted by the sensor means are processed on the basis of simple calculation algorithm so that it is not computationally onerous.

The application of the above considerations to a machine for the laser processing of a material, in particular for laser cutting, drilling or welding, or for the additive manufacture of three-dimensional structures by laser, is achieved through the arrangement of an interferometric system comprising an measurement optical path at least partially integrated in the working head and an optical reference path associated with the measurement optical path, which may also be integrated in or external to the working head, wherein the measurement optical path is reflected or diffused by at least one back-reflective surface of an optical element associated with the optical path for transporting the laser beam, for example interposed along the optical path in the working head.

This allows determining the local position of any optical element associated with the optical transport path of the laser beam, for example interposed along said path in a working head of a machine for laser processing a material, relative to a predetermined nominal local position, and the difference between the positions allows acquiring useful information on the deformation or displacement of the monitored optical element, temporary or permanent, which may be the consequence of incorrect installations or deviations or perturbations which have occurred due to particular operating conditions to which the element is subject, for example dependent on the ambient temperature in the vicinity of the element or the pressure of an assist gas which impinges on the element.

BRIEF DESCRIPTION OF THE FIGURES

Further features and advantages of the invention will appear more clearly from the following detailed description of an embodiment thereof, given by way of non-limiting example with reference to the accompanying drawings, in which.

DETAILED DESCRIPTION

Figure 1:
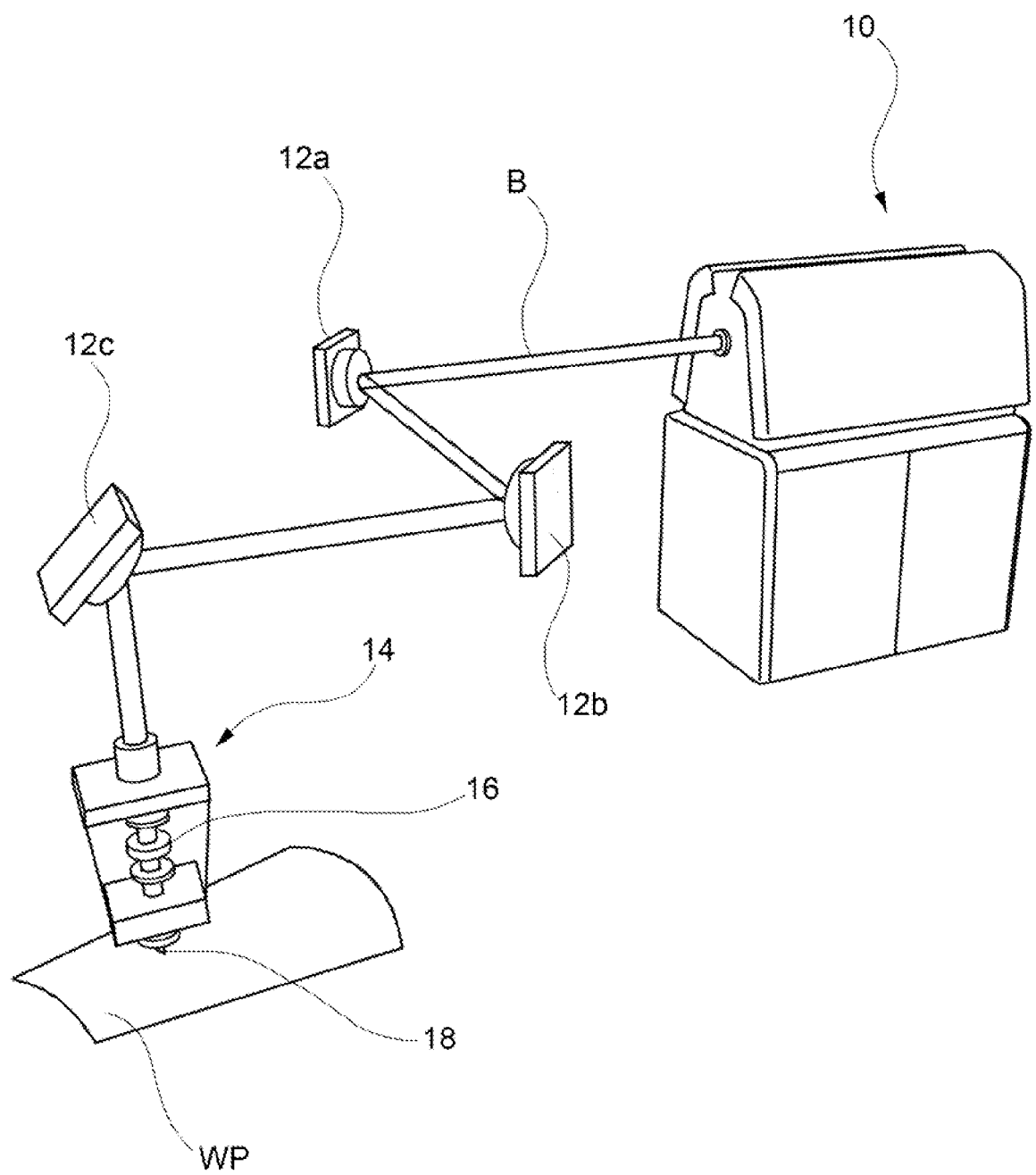
FIGS. 1 and 2 are examples of laser processing machines according to the prior art.
Figure 2:
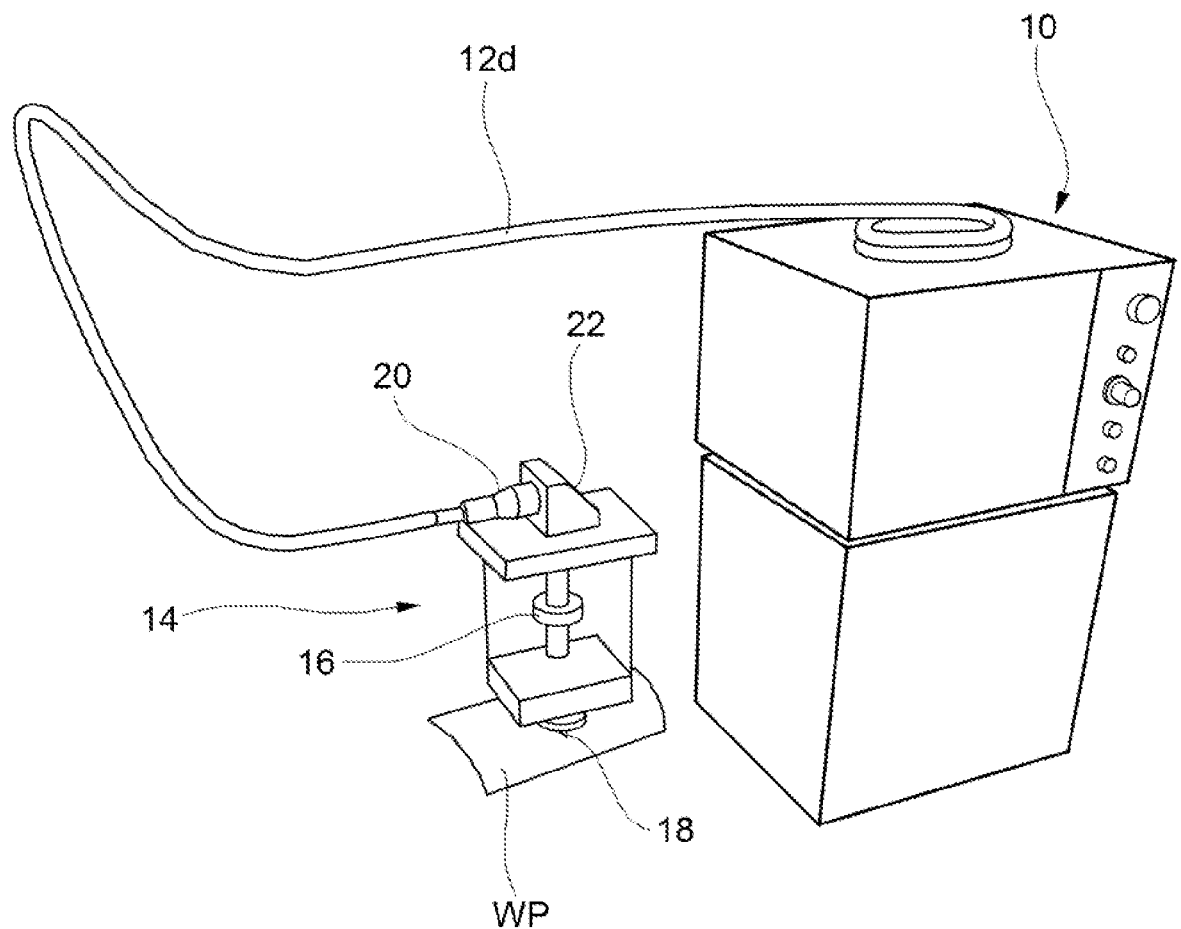
Figures 3, 4A:
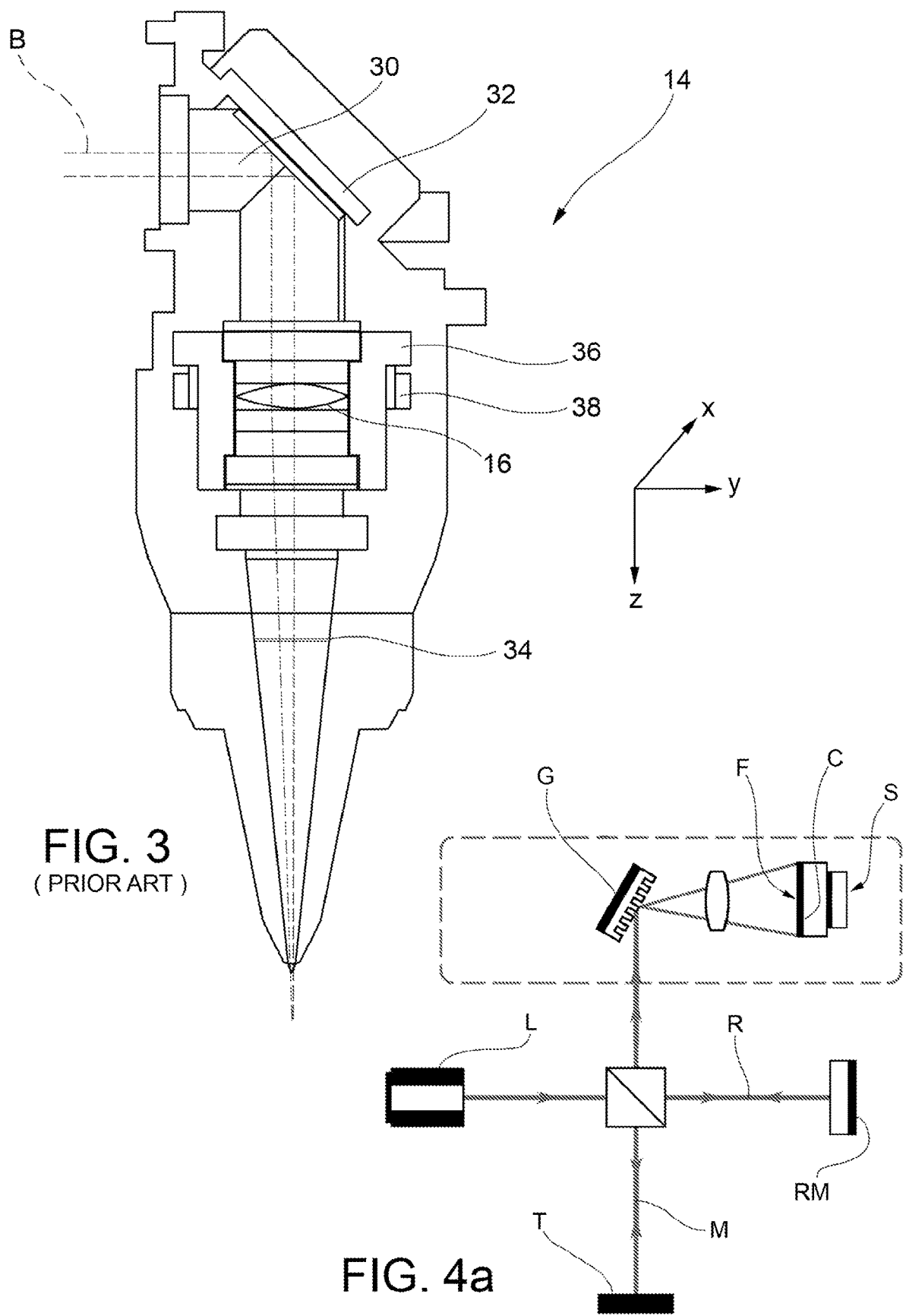
FIG. 3 shows a schematic example of a working head of a laser machine, according to the prior art.
FIG. 4*a* shows a schematic view of the configuration of a low coherence interferometric system with detection in the frequency domain.

FIGS. 1 to 3 have been previously described with reference to the prior art, and their contents are intended to be referred to herein as they are common to the implementation of a controlled processing machine for carrying out a method according to the teachings of the present invention.

FIG. 4*a* shows a schematic view of the Michelson configuration of a low coherence interferometric system with detection in the frequency domain. A collimated beam of measurement optical radiation, indicated with M, coming from a lens T and a collimated beam of the same reference optical radiation, indicated with R, coming from a reference reflective element RM—both originating from a source L—impinge in superposition on a diffraction grating G and from here, through a focusing lens, the spectral distribution of the interfering beams reaches a common incidence region C of a sensor arrangement S, where it forms an interference fringe pattern F, shown in FIG. 4*b*.

The sensor arrangement S comprises, for example, an arrangement of photodetectors along at least one illumination axis of the incidence region (axis x in the figure). The photodetector arrangement is a linear or two-dimensional arrangement of photodetectors, preferably a linear arrangement. The illumination axis of the region of incidence is determined by the intersection between the plane defined by the angle of incidence of the measurement beam M and of the reference beam R and the sensor surface of said sensor arrangement.

Figure 4B:
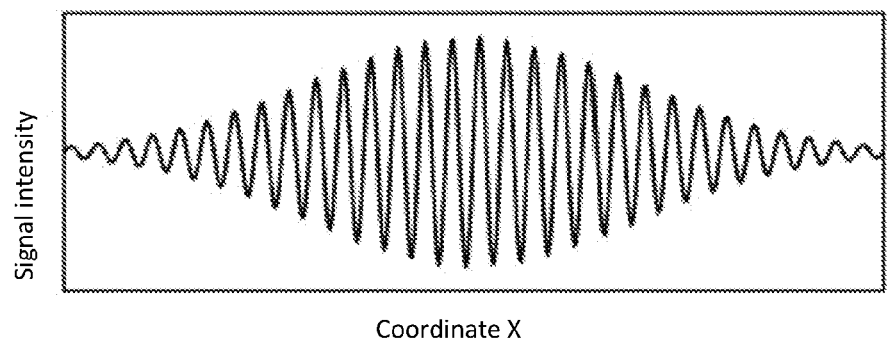
FIG. 4*b* shows an interference pattern F localized on an illumination axis of a sensor arrangement of the interference fringe pattern after wavelength dispersion.
Figure 4C:
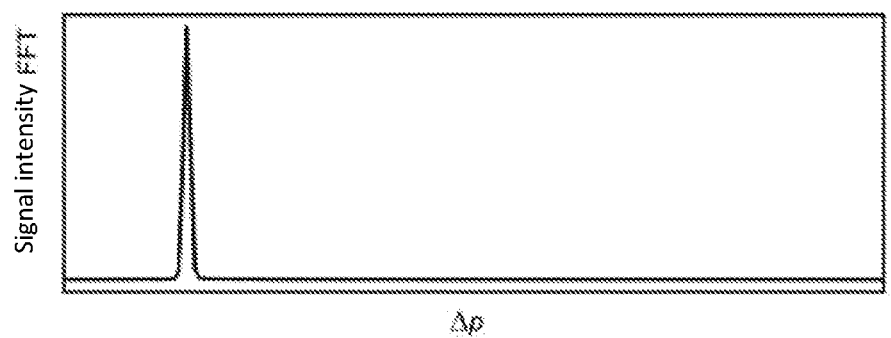
FIG. 4*c* shows the relationship between the frequency of the interference fringes and the difference in optical lengths of the measurement and reference paths.

FIG. 4*c* shows the result of the processing of the acquisition of the interference fringe pattern by the photodetectors, wherein the spectrum of the interfering beams is extracted from the intensity profile of FIG. 4*b* and by means of an FFT algorithm the frequency of the fringes is determined, which is known to depend on the phase difference of the interfering beams, namely on the corresponding difference $\Delta p$ of optical lengths of the measurement and reference paths.

Figure 5A:
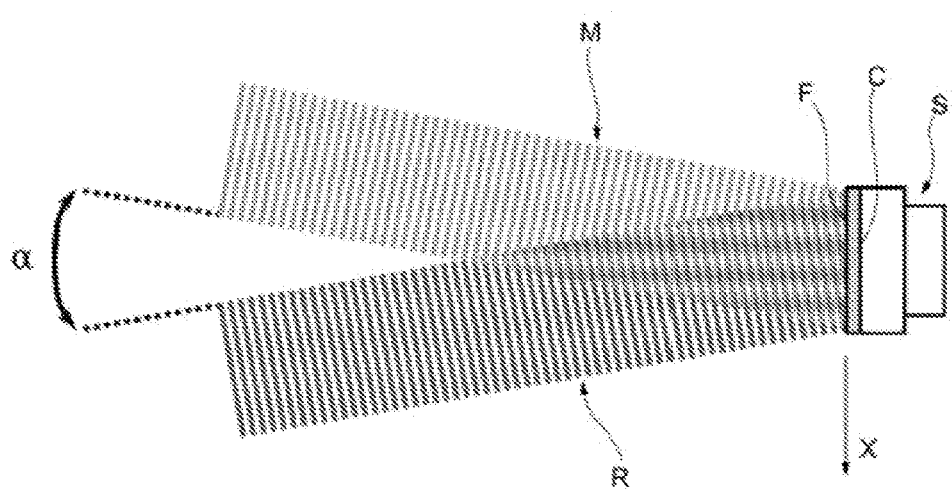
FIG. 5*a* is a schematic view of the configuration of a linear low coherence interferometric system with detection in the space domain.

FIG. 5*a* is a schematic view of the configuration of a low coherence interferometric system with a linear spatial detection. A measurement collimated beam of optical radiation, indicated by M, and a reference collimated beam of the same optical radiation, indicated by R, impinge so as to be superimposed on a common region of incidence C of a sensor arrangement S, at a predetermined angle of incidence α, where they form a pattern of interference fringes F, the extension of which on the common region of incidence is of the order of the coherence length of the optical radiation. The width of the measurement collimated beam of optical radiation and the width of the reference collimated beam of optical radiation are preferably designed so as to substantially illuminate the entire sensor arrangement. In order to increase the intensity and the contrast of the signal detected, the beams may be concentrated on the sensor in the direction that is perpendicular to the illumination axis, for example by means of a cylindrical focusing lens.

The sensor arrangement S comprises, for example, an arrangement of photodetectors along at least one illumination axis of the incidence region (axis x in the figure). The photodetector arrangement is a linear or two-dimensional arrangement of photodetectors, preferably a linear arrangement. The illumination axis of the region of incidence is determined by the intersection between the plane defined by the angle of incidence of the measurement beam M and of the reference beam R and the sensor surface of said sensor arrangement.

Figure 5B:
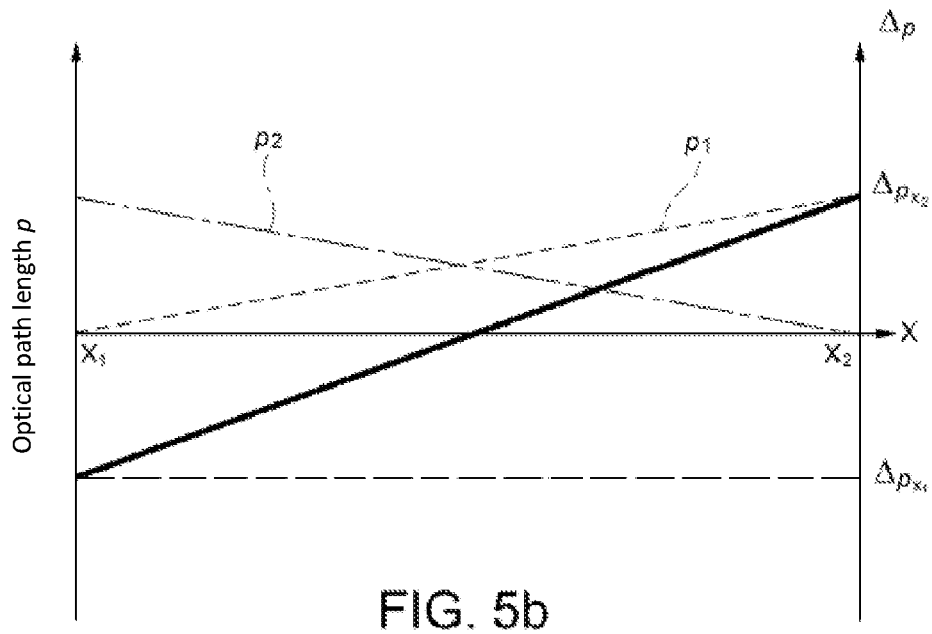
FIG. 5*b* is a schematic view of the variation in the lengths of the measurement and reference optical paths with respect to the relative point of incidence, on an illumination axis of a sensor arrangement, of the pattern of interference fringes.

In FIG. 5b, the graph schematically shows the variation in the lengths p of the measurement and reference optical paths, referring to the initial incident wavefront of the respective measurement and reference beams on the common region of incidence of the sensor arrangement S, in the typical configuration in which the two incident beams are symmetrical on the sensor arrangement. The x-axis indicates the position or x coordinate along the illumination axis of the photodetector arrangement. Reference numeral p1 indicates the additional length of a first optical path, for example the measurement optical path of the measurement optical radiation beam M, with respect to the initial point of incidence of the wavefront of the measurement beam M at a first end of the common region of incidence C, $x_1$, which is the origin of the measurement axis. Reference numeral p2 indicates the additional length of a second optical path, for example the reference optical path of the reference optical radiation beam R, with respect to the initial point of incidence of the wavefront of the reference beam R at a second end of the common region of incidence, x2, which is opposite the first. Reference numeral Δp indicates the difference between the additional lengths of the two paths, p1-p2, which is zero at the middle coordinate of the sensor arrangement, and varies from a value $\Delta p_{x1}$ at the end $x_1$ of the common region of incidence to a value $\Delta p_{x2}$ at the end $x_2$ of the common region of incidence.

Figure 5C:
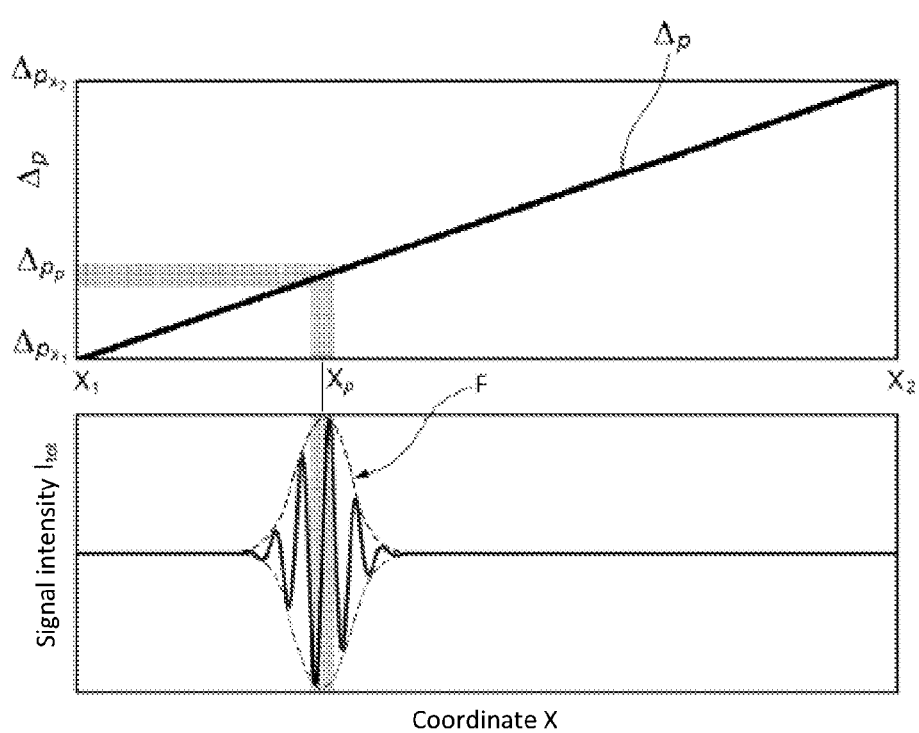
FIG. 5*c* is a schematic view (top graph) of the variation in the difference between the lengths of the measurement and reference optical paths with respect to the relative point of incidence, on an illumination axis of a sensor arrangement, of the pattern of interference fringes, and the identification of a pattern of interference fringes on the illumination axis of the sensor arrangement in a state in which the optical lengths of the measurement and reference paths are equal (bottom graph)

In FIG. 5c, the top graph shows the curve Δp that corresponds to the graph in FIG. 5b, and the bottom graph shows the identification of a pattern of interference fringes F on the illumination axis (x) of the sensor arrangement S that occurs when the optical lengths of the measurement and reference paths are equal. The envelope of the pattern of interference fringes F is indicated with hatching, and the respective difference $\Delta p_p$ between the additional lengths of the paths of the measurement and reference optical beams is associated with the coordinate of the envelope peak, $x_p$, by means of the upper graph.

$P_M$ and $P_R$ indicate the measurement and reference paths, the overall lengths of which may be expressed as $P_M$=P1+p1 and $P_R$=P2+p2, where P1 is the optical length of the measurement optical path from the low coherence optical radiation source to the first wavefront incident on the sensor arrangement, and P2 is the optical length of the reference optical path from the same low coherence optical radiation source to the first wavefront incident on the sensor arrangement, and is preferably constant. It is possible to consider P1 as composed of $P_{nom}$+d, where $P_{nom}$ is the nominal length of the optical path including a first section comprised between the low coherence optical radiation source and a predetermined back-reflective surface of the optical element of which to determine the position, in its predetermined nominal position, and a second section comprised between the aforesaid back-reflective surface and the sensor arrangement S, which sections have a respective predetermined and invariant geometric length. d indicates the position offset of the optical element with respect to its nominal position. P2 is the optical length of the reference optical path, which is equivalent to the optical length $P_{nom}$ of the measurement optical path in a nominal operative condition, wherein the optical element is in its predetermined nominal position.

The difference in optical length between the measurement optical path and the reference optical path is represented mathematically as:

$$P_M - P_R$$

and the interference fringes appear in the condition in which this is zero, that is:

$$P_M - P_R = 0$$

a relationship that may be broken down as:

$$P1 + p1 - (P2 + p2) = 0$$

which may be written again as:

$$P_{nom} + d + p1 - P2 - p2 = 0$$

from which the following is deduced:

$$P_{nom} + d - P2 + \Delta p = 0$$

$$P_{nom} + d - P_{nom} + \Delta p = 0$$

$$\Delta p = -d$$

that is, the current position of the optical element is equal to the difference between the additional lengths of the measurement optical path and the reference optical path.

Therefore, the current local position of an optical element with respect to its nominal local position, determined by a difference in optical length between the measurement optical path and the reference optical path, is attributable to a difference between the additional lengths of the measurement optical path and of the reference optical path, therefore to a movement of the pattern of interference fringes along the illumination axis x of the sensor arrangement S with respect to a nominal position, for example the median plane of said sensor arrangement S.

In the application which is the subject of the invention, the length of the reference optical path is established in such a way as to correspond to the length of the measurement optical path at the predetermined nominal position of the optical element, and the difference between (a) the current local position of said optical element and (b) the predetermined nominal local position of said optical element along the axis of the measurement beam results from the difference in length between the measurement optical path and the reference optical path, recognizable according to the position of the interference fringe pattern along the illumination axis of the region of incidence of the sensor arrangement S—if an interferometric technique with detection of the interference fringe pattern in the space domain is used, or as a function of the frequency of the interference fringe pattern—if an interferometric technique with detection of the interference fringe pattern in the frequency domain is used.

It should be noted that the local position is the position along the axis z of an area of the optical element local to the axis of the measurement optical beam that affects the element, relative to a predetermined reference system, for example an axial reference system along the propagation axis of the processing laser beam, or a Cartesian reference system of the working head. The back-reflective surface of the optical element may be the first surface of the element that the measurement beam encounters, or the surface opposite to it, depending on the quantity of optical radiation that is reflected, preferring to carry out the measurement on the basis of the higher quantity of back-reflected radiation.

The "local position" therefore indicates the absolute position of a rigid element or carries information about the position of an area of an element that is subject to deformation. It is therefore possible that the axis of the measurement beam may be dynamically controlled in a neighborhood of the axis of the processing beam so as to explore the surface of the optical element on a plane xy.

Advantageously, in the preferred case of the interferometric technique with detection of the interference fringe pattern in the space domain, a median position of the interference fringe pattern along the illumination axis of the sensor arrangement corresponds to the nominal position of the optical element. Alternatively, an end position of the interference fringe pattern along the illumination axis may correspond to the nominal position of the optical element, if this position may only vary in one direction, so that the interference pattern only moves towards the opposite end of the illumination axis.

With reference to the bottom graph in FIG. 5c, the position $x_p$ of the pattern of interference fringes along the illumination axis is the intrinsic position of the envelope of the intensity of the optical radiation of said pattern of interference fringes, and this intrinsic position of the envelope of the intensity of the optical radiation of said pattern of interference fringes is—for example—the position of the peak or maximum intensity of the envelope of the optical radiation, or the average position of the photodetectors weighted with the optical intensity of the fringe envelope.

The detection of the fringe envelope may be carried out by means of optical intensity profile demodulation techniques, for example by applying a band-pass spatial filter, or high-pass and low-pass filters in a sequence, so as to reveal the only signal components corresponding to the spatial frequency of the interference fringes. For example, in a first step of processing the optical intensity data, the optical intensity detected by a matrix of sensors is integrated in the direction that is perpendicular to the development direction of the interference fringe, for example for columns of a matrix of sensors oriented so as to receive a pattern of vertically aligned interference fringes (this operation is not required if the sensor arrangement is a linear arrangement of photodetectors on which the beams are focused by means of a cylindrical lens). Subsequently, the signal generated by the photodetectors is normalized with respect to a background signal, for example extracted from an image devoid of interference fringes. Therefore, a high-pass spatial filter is applied, for example to ⅕ of the photodetector spatial frequency in order to remove the baseline and to maintain the pattern of interference fringes. Since, in this way, a signal is obtained that oscillates around zero, the absolute value of the signal is extracted and therefore a low-pass spatial filter is applied, for example to ¹⁄₂₅ of the photodetector spatial frequency in order to extract the envelope of the pattern of interference fringes. The position of the pattern of interference fringes is lastly obtained by detecting the position of the envelope of the fringe pattern by seeking the maximum thereof or by comparing the envelope with a predetermined model function (for example a Gaussian function) and extracting the peak of the model function.

Figure 6:
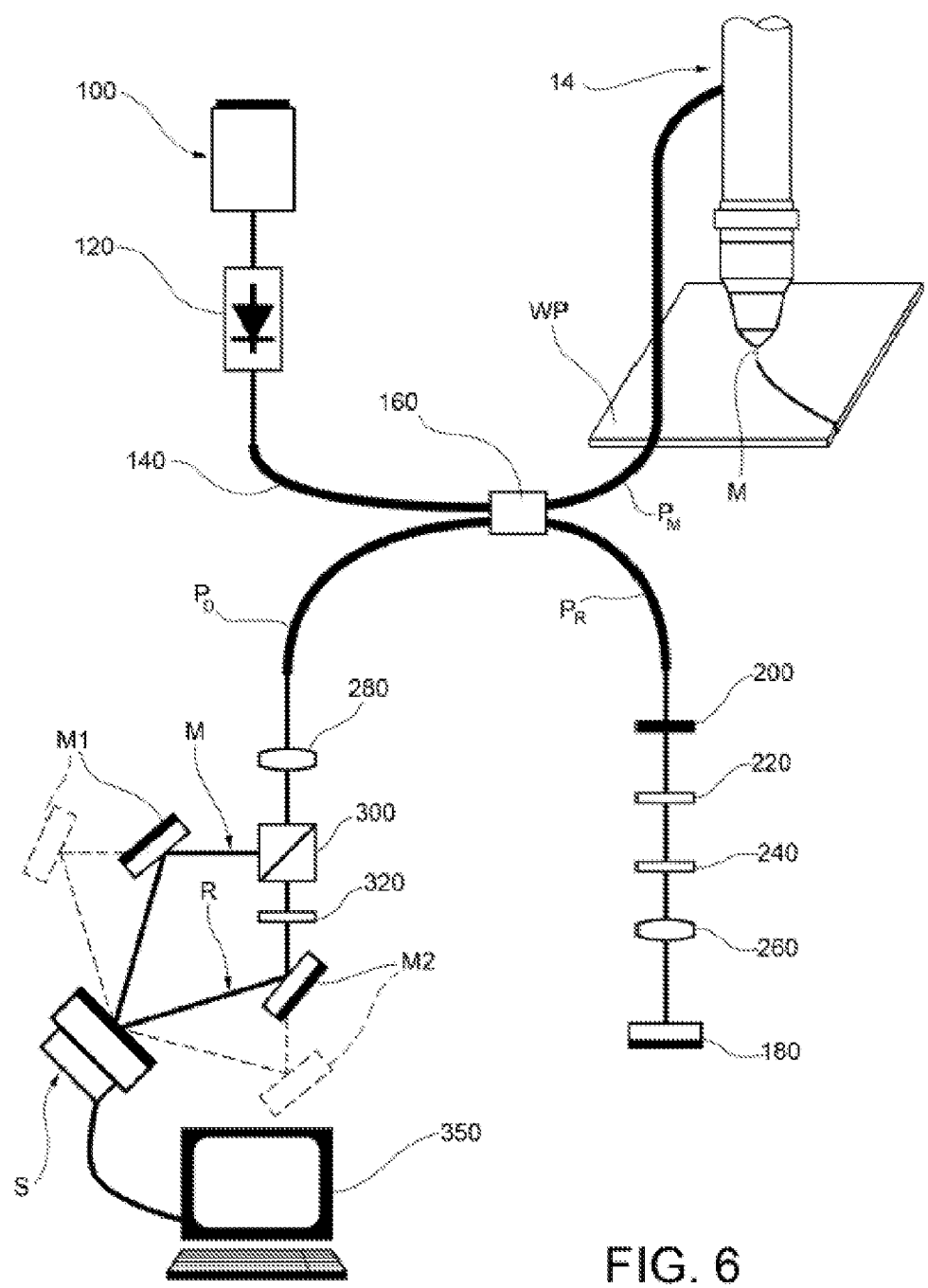
FIG. 6 shows an exemplary diagram of a system for determining the local position of an optical element and the separation distance between a working head of a machine for laser processing a material and the surface of the material, object of the invention.

FIG. 6 shows an exemplary diagram of a system object of the invention for determining the local position of at least one optical element associated with an optical path for transporting a laser beam in a working head 14 of a machine for laser processing of a material WP, integrated—according to the currently preferred embodiment—in a system for determining the separation distance between the working head and the material.

In the figure, 100 indicates a low coherence optical radiation source suitably having linear polarization, such as an LED or a super luminescent diode, for example which operates in the visible or near-infrared wavelength range. The optical radiation emitted by the source 100, downstream of a suitable optical isolator 120, is injected into an optical waveguide, for example an optical fiber 140, and carried to a beam splitter 160 that is adapted to generating a measurement beam of optical radiation M, which is routed on a measurement optical path $P_M$, and a reference optical radiation beam R that is routed on a reference optical path $P_R$.

The measurement optical path $P_M$ and the reference optical path $P_R$ are guided paths and include optical guides (for example optical fibers) that are adapted to maintain the same polarization of the beam along the entire path.

The measurement optical path $P_M$ is conducted to the working head 14 of a machine for laser processing a material as described above, and possibly emerges from there towards the material WP being processed, on which it possibly impinges. The region where the measurement beam M is output corresponds to the section of the measurement head, the distance of which from the above-mentioned material is intended to be measured, for example the opening in the nozzle for supplying the flow of assist gas or the output for the laser beam.

The optical reference path $P_R$ is instead led to a return reflective element 180, preferably through the interposition of an optical density filter 200, of an optical dispersion compensation element 220, of a sheet λ/4 240 and of a focusing lens 260. The reflective optical element 180 is arranged along the reference optical path such that the optical length of that path from the beam splitter 160 to the reflective optical element 180 corresponds to the optical length of the measurement optical path from the beam splitter 160 to the (reflective) surface of the optical element to be monitored, that is, the position of which is to be determined, in its predetermined nominal position. The reflective optical element may be axially moved and arranged in such a way as to determine a different optical reference path length, or one of a plurality of reference optical paths including respective reflective optical elements 180 and having different optical lengths may be selected, to switch between methods for determining the local position of different optical elements and possibly to a method for determining the separation distance between the material being processed WP and the working head, i.e. the end of the working head proximal to the material, such as the opening of the assist gas nozzle or the beam output.

Specifically, in the case of determining the position of a plurality of optical elements interposed along the optical path for transporting the laser beam, a plurality of optical measurement paths are provided, associated with a plurality of corresponding reference optical paths, by extracting a corresponding plurality of measurement optical beams respectively associated with each of said plurality of optical elements, downstream of the reflection or diffusion from at least one back-reflective surface of each of said plurality of optical elements. The plurality of reference optical paths is arranged to lead respective separate or superimposed reference optical beams, i.e. it is determined by means of a continuous variation of the length of a basic reference optical path through an optical element for deviation and separation of the reference optical beams.

The measurement and reference optical paths $P_M$, $P_R$ are such that the optical radiation passes through them in both directions, returning towards the beam splitter 160 after reflection, respectively to the at least partially back-reflective surface of the optical element and to the reflective optical element 180. In the reference optical path $P_R$, the double passage of the reference beam R through the $\lambda/4$ plate 240 brings about a 90° rotation of the linear polarization of the beam, which thereby assumes a linear polarization that is orthogonal to the linear polarization of the measurement beam M. The beam splitter 160 then performs a recombination of the measurement optical beam and of the reference optical beam and directs them, superimposed, along a detection optical path $P_D$ (common to a portion of the measurement optical path and to a portion of the reference optical path) towards the sensor arrangement S.

Both the measurement and reference optical beams are led through a cylindrical focusing lens 280, which may focus the collimated beam in just one direction, in particular the direction orthogonal to the illumination axis of the sensor arrangement, with the aim of concentrating the signal along this axis, thereby optimizing the illumination of the photodetectors, and arrive at a polarizing beam splitter 300 that performs the separation of the measurement optical beam M from the reference optical beam R on the basis of their polarization, directing the first thereof towards a first reflective element M1 and the second thereof towards a second reflective element M2, in this last case by interposing a $\lambda/2$ plate 320 that may restore the original polarization. On account of this configuration, the first and the second reflective element M1, M2 direct the measurement optical beam and the reference optical beam towards the sensor arrangement S, respectively, and more precisely towards the common region of incidence of the sensor arrangement, at an angle of incidence $\alpha$. The angle of incidence $\alpha$ may be advantageously controlled within a preset range of values in an embodiment of the system in which the reflective elements M1 and M2 are respectively moveable in translation along the axis of propagation of the relative optical beam and in rotation about an axis that is normal with respect to the incidence plane (dashed position in the figure).

Of course, in an embodiment based on an interferometric technique with detection of the pattern of interference fringes in the frequency domain, the optical detection path $P_D$ does not again provide for the separation of the measurement and reference beams, but comprises a spectrometer according to the architecture described in FIG. 4*a*.

As described above, the sensor arrangement S comprises a plurality of photodetector devices, each of which is adapted to emit a particular signal representative of the optical intensity incident thereon, and these signals are transmitted, as a whole, to processing means 350 configured for identifying a pattern of interference fringes F that forms on the common region of incidence C of the sensor arrangement by acquiring the overall incident optical power of the superimposed measurement optical beam and reference optical beam.

Preferably, the measurement optical path and the reference optical path comprise corresponding optical elements, and in particular the reference optical path comprises a reflective return element, the reflective and optical diffusion properties of which correspond to the reflective and optical diffusion properties of the monitored optical element interposed in the measurement optical path as much as possible. Optionally, optical attenuating means may be provided, adapted to balance the intensity of the reference optical radiation reflected by said return reflective element with respect to the intensity of the measurement optical radiation reflected by the monitored optical element.

By means of the system of FIG. 6, or equivalent systems, a method for determining the local position of at least one optical element is implemented.

The method comprises generating a low coherence measurement optical radiation beam M which is led towards an optical element associated with, for example, interposed along, the optical transport path of the laser beam in a working head of a machine for laser processing of a material, and—reflected or scattered by at least one back-reflective surface of said optical element—is led through the working head 14 towards the sensor arrangement S.

In the case of reflective optical elements, it may be assumed that the reflection or scattering of the measurement optical beam occurs at the first surface of the element, while in the case of reflective optical elements it may be assumed that the reflection or scattering of the measurement optical beam occurs at both surfaces of the element.

The measurement optical radiation beam M specifically travels an optical measurement path from the source 100 to the sensor arrangement S which includes two sections having a respective predetermined and invariant geometric length when said optical element is in a predetermined nominal position corresponding to a predetermined operative condition, respectively, a first section comprised between the source 100 and the back-reflective surface of said optical element, and a second section comprised between the back-reflective surface of said optical element and the sensor arrangement S.

From the same source 100 a beam of said reference low coherence optical radiation R is generated, which is led towards the sensor arrangement S. The reference beam R travels along a reference optical path $P_R$ of optical length equivalent to the optical length of the measurement optical path $P_M$ in the nominal operative condition in which the position of said optical element is the predetermined nominal position.

The measurement beam M and the reference beam R are superimposed on the common region of incidence C of the sensor arrangement S along a preset illumination axis.

Applying an interferometric technique with detection of the pattern of interference fringes in the space domain, the position of a pattern of interference fringes F between the measurement beam M and the reference beam R along the illumination axis on the common incidence region C is detected by the processing means 350 and allows, as described above, determining the difference in optical length between the measurement optical path $P_M$ and the reference optical path $P_R$, which is indicative of the difference between (a) the current local position of the optical element and (b) the predetermined nominal local position of said optical element along the axis of the measurement beam.

By applying an interferometric technique with detection of the pattern of interference fringes in the frequency domain, the frequency of a pattern of interference fringes F between the measurement beam M and the reference beam R obtained by scattering said beams in wavelength along the illumination axis on the common incidence region C is detected by the processing means 350 and allows, as described above, determining the difference in optical length between the measurement optical path $P_M$ and the reference optical path $P_R$, which is indicative of the difference between (a) the current local position of the optical element and (b) the predetermined nominal local position of said optical element along the axis of the measurement beam.

The method may be implemented in real time during a processing of a material, but also before or after processing, for example to qualify the state of an optical element of the working head. The material being processed may also be absent in a monitoring step of an optical element conducted separately from a processing step, for example using a low coherence optical radiation at a wavelength maximally reflected by said optical element. In the event that the material is present when the monitoring of the optical elements takes place during a processing step, part of the measurement signal is taken which is back-reflected to a surface of the optical element of interest for which a corresponding reference optical path is selected.

Figure 7:
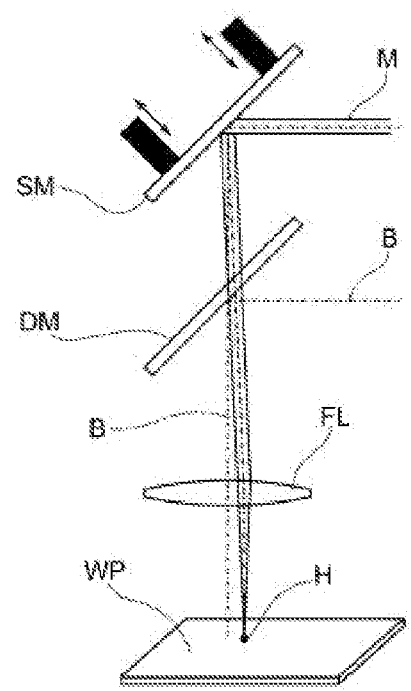
FIG. 7 schematically shows the path of the processing laser beam and the low coherence measurement optical beam in a working head according to an exemplary embodiment of the working head.

With reference to FIG. 7, an exemplary embodiment of the path of the processing laser beam B and of the measurement optical beam M within the working head is schematically shown.

FIG. 7 shows a reflective element that deflects the laser beam, such as a dichroic mirror, indicated by DM, which deflects the optical axis of propagation of the processing laser beam B from a head-entering direction to a direction of incidence on the material WP being processed. This is a configuration that is adopted in one embodiment of the working head comprising a lateral laser beam input. In this embodiment, the measurement optical radiation beam M is directed towards the optical element to be monitored downstream (and towards the material measurement region) —passing through the dichroic mirror DM without appreciable deflection—by means of a reflective optical scanning system SM, or folding mirror, the inclination of which is controlled, for example by piezoelectricity, according to the need to explore different areas of the element to control the position in which the measurement point intercepts the surface of the element. The subject element is, in the example shown without limitation, a focusing lens FL. As may be seen in the figure, the propagation direction of the measurement beam may be controlled by the inclination of the reflective optical scanning system SM so as not to be coaxially superimposed on the processing laser beam B, but to be different therefrom. A person skilled in the art will also understand that a "dual" or "opposite" configuration is possible, in which a dichroic mirror is provided, which is transparent to the processing laser beam but reflects the measurement beam coming from a lateral input.

Figure 8A:
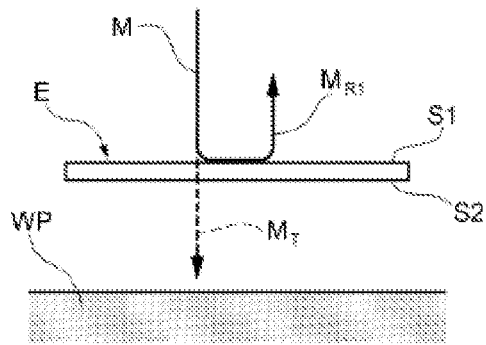
FIGS. 8*a*-8*e* are schematic representations of different possible conditions of back-reflection or partial diffusion of the measurement optical radiation at an optical element.
Figure 8B:
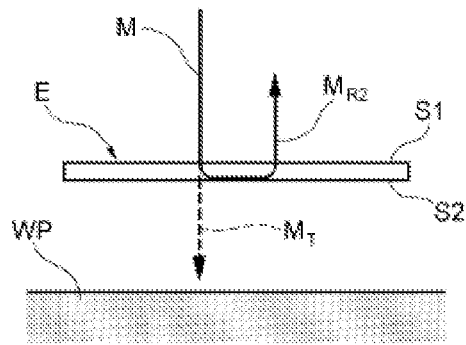
Figure 8C:
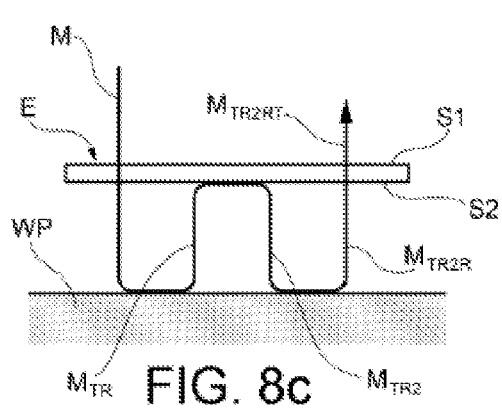

FIGS. 8*a*, 8*b* and 8*c* schematically show a first condition of back-reflection or partial diffusion of the measurement optical radiation, to a first surface S1 or to a second surface S2 of the optical element E, and with possible interposition of the material WP being processed. $M_T$ denotes the part of the measurement optical radiation beam that passes through the optical element E, and $M_{R1}$ and $M_{R2}$ denote the part of the measurement optical radiation beam that is reflected at the surfaces S1 or S2 of the optical element E. In FIG. 8*c*, $M_{TR}$ denotes the part of the measurement optical radiation beam that passes through the optical element E, but is reflected in the return path by the material WP, with $M_{TR2}$ the part of the measurement optical radiation which is further reflected by the surface S2 of the optical element E and with $M_{TR2R}$ the part of the measurement optical radiation beam which is further reflected by the material WP and with $M_{TR2RT}$ the part of the measurement optical radiation beam which passes through the optical element E.

Figure 8D:
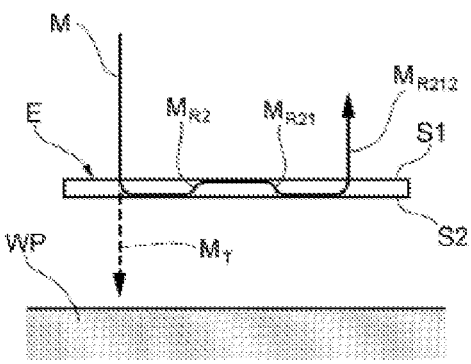

Another possible operative condition is shown in FIG. 8*d*, in which the measurement optical path includes at least a third intermediate section between the first section from the source to the back-reflective surface S2 of the optical element E and the second section between the back-reflective surface S2 of the optical element E and the sensor arrangement S. Said third section is comprised between a first and a second back-reflection to the back-reflective surface S2 of the optical element and includes at least one at least partial back-reflection to the back-reflective surface S1 of the optical element E. $M_{R2}$ indicates the part of the measurement optical radiation beam which is reflected by the surface S2 of the optical element E, with $M_{R21}$ the part of the measurement optical radiation beam which is further reflected by the surface S1 of the optical element E, and with $M_{R212}$ the part of the measurement optical radiation beam which is reflected again by the surface S2 of the optical element E. The aforementioned third section has a respective predetermined nominal geometric and optical length under nominal conditions when the optical element is in the predetermined nominal position and/or in the predetermined operative condition.

Figure 8E:
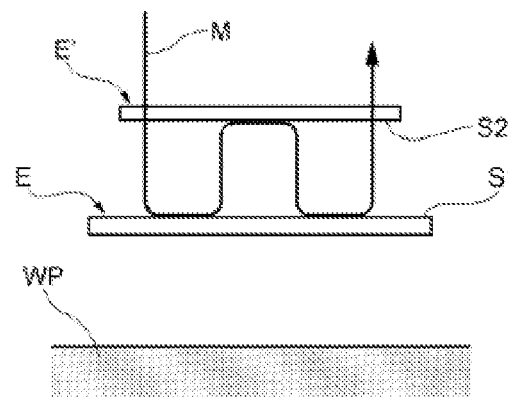

Another possible operative condition is shown in FIG. 8*e*, in which the optical measurement path includes at least a third intermediate section between the first section from the source to the back-reflective surface S1 of the optical element E and the second section between the back-reflective surface S1 of the optical element E and the sensor arrangement S. Said third section is comprised between a first and a second back-reflection to the back-reflective surface S1 of the optical element and includes at least one at least partial back-reflection to a back-reflective surface S2' of a different optical element E', also interposed along the optical transport path of the laser beam. The aforementioned third section has a respective predetermined nominal geometric and optical length when the optical element E is in the predetermined nominal position and/or in the predetermined operative condition.

The predetermined operative condition is a rest condition of the machine or a processing condition associated with predetermined processing parameters.

Moreover, the first and the second sections of the measurement optical path may include at least one at least partial back-reflection at a back-reflective surface of a different optical element interposed along the optical transport path for the laser beam or of the material being processed.

Advantageously, the described method allows verifying the positioning and the possible deformation or displacement, temporary (in process) or permanent, of an optical element associated with the optical transport path of a laser beam, such as a lens or a mirror. An optical element, in fact, may undergo changes in shape due to the temperature of the environment in which it resides, or—if flexible—due to the pressure to which it is exposed, or better due to the pressure difference established between rooms of an environment that it divides. An optical element may also be subject to changes in position due to the effect of temperature or pressure if these physical parameters affect the receiving seat thereof, for example a deformable ring, which may translate.

A specific application case is described below.

In a machine for laser cutting, drilling or welding or for the additive manufacture of three-dimensional structures by laser, comprising a working head carrying a nozzle for supplying an assist gas flow, it is desirable to control the assist gas pressure in the nozzle chamber without having to resort to the installation of ad hoc sensors. Knowledge of the assist gas pressure is also useful in determining the influence of the assist gas pressure on the propagation features of a measurement optical radiation beam propagated through the nozzle and used for example for determining the distance of the working head (of the nozzle) from the material being processed.

The pressure of the assist gas in the assist gas chamber of the nozzle may be derived indirectly from a measurement of the change in the local position of a surface of a protective optical element or boundary of the assist gas chamber interposed along the optical transport path of the processing laser beam or of an assist optical element facing said assist gas chamber, possibly outside the axis of the processing laser beam, according to a predetermined reference model indicative of a predetermined nominal relationship between the position of the surface of said optical element relative to a respective predetermined nominal position corresponding to a predetermined reference pressure value of the assist gas, and the pressure of the assist gas.

This reference model may be built starting from a direct pressure measurement and from the detection of the position of the optical element in a calibration step.

Figure 9:
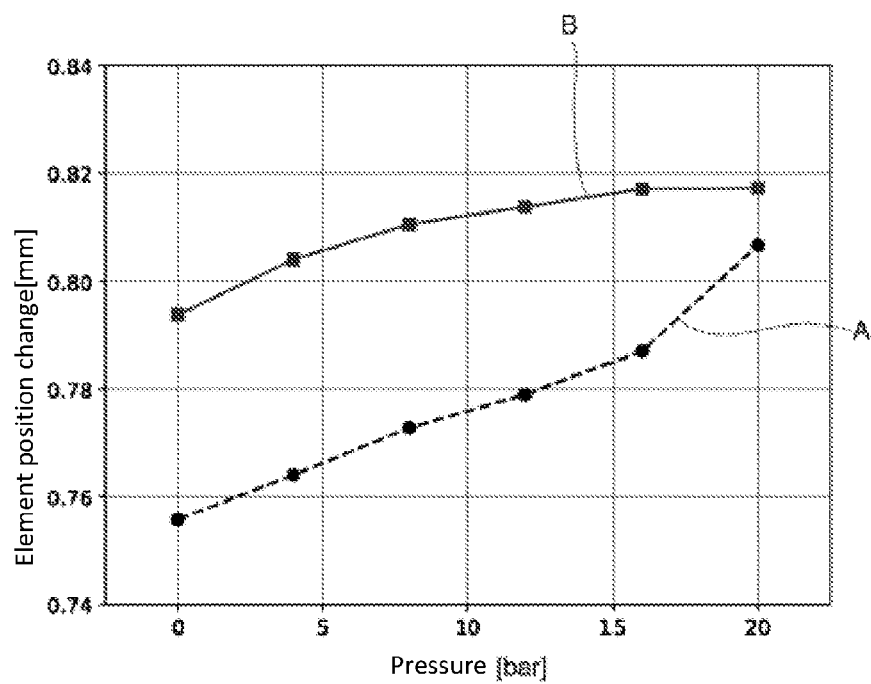
FIG. 9 is a graph showing a dependence relationship of the outcome of the interferometric reading, expressed in terms of variation of the local position of a surface of an optical element for protection or delimitation of the assist gas chamber along the axis of the measurement beam, from the trend (increasing, decreasing) of the pressure of the assist gas.

FIG. 9 shows a dependence relationship of the outcome of the interferometric reading, expressed in terms of variation of the local position of a surface of an optical element for protection or delimitation of the assist gas chamber along the axis of the measurement beam, from the trend (increasing, decreasing) of the pressure of the assist gas in the aforementioned chamber. Curve A represents the change in the local position of a surface of the protective optical element or boundary of the assist gas chamber as the pressure within the chamber increases. Curve B represents the change in the local position of a surface of the protective optical element or boundary of the assist gas chamber as the pressure within the chamber decreases. The hysteresis between the two curves may be attributed to non-elastic deformations of the materials involved.

In this embodiment, the reference optical path advantageously comprises an optical element corresponding to the optical protection element or to the optical assist element, arranged along the reference optical path in a position corresponding to the nominal position of the optical protection element or of the assist optical element in the measurement optical path and subject to a controlled pressure value which constitutes the aforementioned predetermined reference pressure value of the assist gas in the measurement optical path.

Similarly to the indirect pressure measurement, a further specific application case of the present invention relates to the determination of the temperature of an optical element or of a transmission medium interposed along the optical transport path of the processing laser beam or of the environment in which the element is located, if this determines a local deformation or displacement. The state of said optical element is determined by adopting a method for determining its local position as described above in which the reference beam travels along a reference optical path of optical length equal to the optical length of the measurement optical path in a nominal operative condition including a partial back-reflection of the measurement beam at a surface of the optical element when it is in the predetermined nominal position corresponding to a predetermined reference temperature value. The operating temperature of the optical element is then determined according to a predetermined reference model indicative of a nominal relationship between the position of the optical element relative to the predetermined nominal position and the temperature of the element.

A further specific application case of the method for determining the position of an optical element object of the invention relates to the determination of a perturbation of the current optical length of at least a portion of the measurement optical path with respect to the current optical length of a corresponding portion of the reference optical path.

The propagation features of the measurement optical radiation beam are influenced by the physical parameters (temperature, pressure, mechanical deformations) of the transmission medium in which it propagates, essentially since the refractive index of the transmission medium is variable according to such parameters. The method according to the invention may therefore be used for measuring refractive index variations of the crossed transmission media, for example refractive index variations induced by the pressure of the assist gas, assuming the positions of the back-reflective optical elements as static.

In a machine for laser cutting, drilling or welding of a material, or for the additive manufacturing of three-dimensional structures by laser, comprising a working head carrying a nozzle for supplying an assist gas flow, the measurement optical radiation beam is propagated through the nozzle and its propagation features are influenced by the pressure of the assist gas.

In order to improve the accuracy of the process object of the invention, the determination of the difference in optical length between the measurement optical path and the reference optical path may therefore preferably be based on a normalized optical length of the measurement optical path which is calculated starting from the geometric length and a normalized refractive index of the portion of said optical measurement path that passes through the assist gas chamber, that is the nozzle. The normalized refractive index is calculated as a function of the pressure of the assist gas in said chamber, according to a predetermined nominal relationship depending on the refractive index of the transmission medium filled by the assist gas on the pressure of said gas.

In more general terms, since the optical length of the measurement optical path is dependent on the geometric length of the path and on the refractive index of the transmission medium, the determination of the difference in optical length between the measurement optical path and the reference optical path may be based on a normalized optical length of the optical measurement path, which is calculated starting from the geometric length and a normalized refractive index of the transmission medium of said measurement optical path, or of a transmission medium of a portion of said measurement optical path, which refractive index is calculated as a function of the variation of at least one physical parameter of the transmission medium, such as the temperature according to a predetermined nominal relationship between the refractive index or reflectivity and the temperature of the element itself.

Alternatively, or in combination with the above, the determination of the optical length difference between the measurement optical path and the reference optical path may be based on a normalized optical length of the measurement optical path which is calculated starting from the normalized geometric length and from a refractive index of a material transmission medium of a portion of said measurement optical path, in which the normalized geometric length is calculated as a function of the mechanical deformation or the mechanical deformation (for example, lengthening or shortening) of said material transmission medium according to a predetermined nominal relationship.

Advantageously, the technique object of the invention allows determining a perturbation of the current optical length of at least a portion of the measurement optical path with respect to the current optical length of a corresponding portion of the reference optical path, and correcting the determined value of the local current position of the optical element along the axis of the measurement beam with respect to the nominal local position on the basis of the determined perturbation, for example by subtracting the measurement of the perturbation from the measurement of the current local position of the element (possibly after applying a correction factor). The perturbation occurs, for example, due to the variation of at least one physical parameter of the transmission medium within which the measurement optical path extends.

For these purposes, the measurement beam incident on the sensor arrangement S comprises at least one calibration measurement beam which results from the travel of a calibration measurement optical path, wherein the measurement beam is reflected or diffused by at least one back-reflective surface of a static optical element interposed along the measurement optical path, and wherein the reference beam incident on the sensor arrangement S comprises a respective calibration reference beam which results from the travel of a calibration reference optical path having an optical length equivalent to the optical length of the calibration measurement optical path in a nominal operating condition of calibration in which the geometric length and the refractive index of the transmission medium of the calibration measurement optical path are equal to the geometric length and to the refractive index of the transmission medium of the calibration reference optical path within a predetermined tolerance range. The static optical element may be, for example, the optical focusing system 16 of the laser beam.

Determining the perturbation of the current optical length of at least a portion of the measurement optical path includes the following operations:
  superimposing the calibration measurement beam and the calibration reference beam on a common incidence region of the sensor arrangement S, along the illumination axis;
  detecting the position of a pattern of interference fringes between the calibration measurement beam and the calibration reference beam along the illumination axis on the common region of incidence, or the frequency of a pattern of interference fringes between the calibration measurement beam and the calibration reference beam, if an interferometry technique with frequency domain detection is applied; and
  determining a difference in optical length between the calibration measurement optical path and the calibration reference optical path—indicative of a difference between (a) the geometric length of the calibration measurement optical path and the geometric length of the calibration reference optical path, and/or (b) the refractive index of the calibration measurement optical path and the refractive index of the calibration reference optical path-depending on either of the position of the pattern of interference fringes along the illumination axis of the region of incidence, or of the frequency of the pattern of interference fringes in the frequency domain.

The optical length difference between the calibration measurement optical path and the calibration reference optical path is indicative of the aforementioned perturbation of the current optical length of at least a portion of the measurement optical path.

The correction of the determined value of the current local position of the optical element along the axis of the measurement beam with respect to the nominal local position on the basis of the determined perturbation is carried out, for example, by subtracting the calibration value from the main measurement value.

Improvements of the invention will be described hereinafter in the present description.

In particular, a solution to increase the difference interval between the lengths of the measurement and reference paths measurable by the technique of the invention is to exploit partial back-reflections at the surfaces of at least one different optical element interposed along the path of the processing laser beam and of the measurement optical radiation beam, or of exploiting reference optical paths of predetermined lengths different from the length of the main reference optical path.

In an embodiment, the measurement beam incident on the sensor arrangement S comprises a main measurement beam which results from the travel of a main measurement optical path with reflection from the back-reflective surface of the optical element being measured and with transmission through any other optical element interposed along the optical path of the processing laser beam upstream of said optical element being measured, and at least one additional multiplexed measurement beam which results from the travel of an additional measurement optical path, with reflection from the back-reflective surface of said optical element being measured and having a geometric length greater than the geometric length of the main measurement optical path, for example because it includes at least a partial back-reflection on the surface of a different optical element interposed along the optical path of the processing laser beam and of the measurement optical radiation beam.

In this embodiment, the method of the invention is based on the detection of the position of an additional pattern of interference fringes on the common incidence region C of the sensor arrangement S, determined by the interference between the additional measurement beam and the reference beam. In an interferometric technique with detection of the pattern of interference fringe in the space domain, the additional pattern of interference fringes has for example (i) a peak or maximum intensity of the envelope of the optical radiation distinct from, for example lower than, the peak or maximum intensity of the envelope of the optical radiation of the main pattern of interference fringes between the main measurement beam and the reference beam, or (ii) an intrinsic position of the envelope of intensity of the optical radiation that is different from the intrinsic position of the optical radiation intensity of the main interference pattern, if it appears at the same time as the main interference pattern.

In the above condition, a difference in optical length is therefore determined between the additional measurement optical path and the reference optical path, which is indicative of a difference between (a) the current local position of said optical element and (b) the predetermined nominal local position of said optical element along the axis of the measurement beam, as a function of the position of the additional pattern of interference fringes along the illumination axis of the region of incidence, or of the frequency of said pattern of interference fringes in the frequency domain.

In a different embodiment, the reference beam incident on the sensor arrangement S comprises a main reference beam which results from the travel of a main reference optical path and at least one additional multiplexed reference beam which results from the travel of an additional reference optical path having a geometric length different from the geometric length of the main reference optical path.

In this embodiment, the method of the invention is based on the detection of the position of an additional pattern of interference fringes on the common incidence region of the sensor arrangement S, determined by the interference between the measurement beam and the additional reference beam.

Also in this case, in an interferometric technique with detection of the pattern of interference fringe in the space domain, the additional pattern of interference fringes has for example (i) a peak or maximum intensity of the envelope of the optical radiation distinct from, for example lower than, the peak or maximum intensity of the envelope of the optical radiation of the main pattern of interference fringes between the measurement beam and the main reference beam, or (ii) an intrinsic position of the envelope of intensity of the optical radiation that is different from the intrinsic position of the optical radiation intensity of the main interference pattern, if it appears at the same time as the main interference pattern.

In the event that several distinct operating intervals are not alongside or superimposed on the sensor arrangement, but are sufficiently separated to alternately show the respective interference fringes, the selection of the pattern of interference fringes occurs by selecting the additional reference path.

In the above condition, a difference in optical length is therefore determined between the measurement optical path and the additional reference optical path, which is indicative of a difference between (a) the current local position of said optical element and (b) the predetermined nominal local position of said optical element along the axis of the measurement beam, as a function of the position of the additional pattern of interference fringes along the illumination axis of the region of incidence, or of the frequency of said pattern of interference fringes in the frequency domain.

Conveniently, the accurate determination of the position of an optical element, and better still of each optical element of the transport path of the laser beam, which may be selected through the consideration of a respective reference optical path which may be associated with the measurement optical path, allows a control unit of the laser processing machine to operate in feedback the correction or control of some operating parameters, such as the pressure of the assist gas, or to emit an alarm signal and stop each working process, if it determines that an optical element is in an abnormal position. This is particularly useful for improving the safety of a manufacturing process, for example.

It should be noted that the proposed embodiment for the present invention in the foregoing discussion has a purely illustrative and non-limiting nature of the present invention. A man skilled in the art can easily implement the present invention in different embodiments which however do not depart from the principles outlined herein and are therefore included in the present patent.

This is particularly applicable with regard to the possibility of using different low coherence optical radiation wavelengths to those cited, or measurement and reference optical paths having interposed optical elements that are different from those illustrated in FIG. 6 purely by way of non-limiting example.

Of course, the principle of the invention being understood, the manufacturing details and the embodiments may widely vary compared to what has been described and illustrated by way of a non-limiting example only, without departing from the scope of the invention as defined in the appended claims.

The invention claimed is:

1. A method for determining a local position of at least one optical element associated with an optical transport path for a laser beam in a working head of a machine for laser processing of a material, the method comprising:
generating a respective measurement beam of low coherence optical radiation, leading said measurement beam towards said at least one optical element, and leading the measurement beam reflected or diffused by at least one back-reflective surface of said at least one optical element, on which said measurement beam impinges with at least a partial back-reflection, towards an optical interferometric sensor arrangement, wherein the measurement beam travels a measurement optical path from a respective source to said optical interferometric sensor arrangement including a first section between said source and said at least one back-reflective surface of said at least one optical element and a second section between said at least one back-reflective surface of said at least one optical element and the interferometric sensor arrangement, having a respective predetermined nominal geometric length when said at least one optical element is in a predetermined nominal position corresponding to a predetermined operating condition,
generating a respective reference beam of said low coherence optical radiation, and leading said reference beam towards said optical interferometric sensor arrangement, wherein the reference beam travels a reference optical path having an optical length equivalent to the optical length of the measurement optical path in a nominal operating condition in which a position of said at least one optical element is the predetermined nominal position;
superimposing the measurement beam and the reference beam on a common region of incidence of said optical interferometric sensor arrangement, along a predetermined illumination axis;
detecting a position of a pattern of interference fringes between the measurement beam and the reference beam along said predetermined illumination axis on said common region of incidence, wherein an extension of said pattern of interference fringes along the predetermined illumination axis corresponds to a coherence length of said low coherence optical radiation, or detecting a frequency of a pattern of interference fringes in a wavelength spectrum, obtained by an interference between the measurement beam and the reference beam by wavelength dispersion of said measurement and reference beams, whose extension in a frequency domain is determined by the coherence length of said low coherence optical radiation; and
determining a difference in optical length between the measurement optical path and the reference optical path, indicative of a difference between (a) a current local position of said at least one optical element and (b) a predetermined nominal local position of said at least one optical element along an axis of the measurement beam, as a function respectively of the position of said pattern of interference fringes along said predetermined illumination axis of said common region of incidence, or of the frequency of said pattern of interference fringes in the frequency domain.

2. The method of claim 1, wherein said measurement optical path includes at least a third section intermediate between said first and second sections and comprised between a first back-reflection and a second back-reflection at said at least one back-reflective surface of the at least one optical element, which includes at least one at least partial back-reflection at a second back-reflective surface of said at least one optical element, said third section having a respective predetermined nominal geometric and optical length when said at least one optical element is in the predetermined nominal position and/or in the predetermined operating condition.

3. The method of claim 1, wherein said measurement optical path includes at least a third section intermediate between said first and second sections and comprised between a first back-reflection and a second back-reflection at said at least one back-reflective surface of the at least one optical element, which includes at least one at least partial back-reflection at a back-reflective surface of a different optical element interposed along the optical transport path for the laser beam, said third section having a respective predetermined nominal geometric and optical length when said at least one optical element is in the predetermined nominal position and/or in the predetermined operating condition.

4. The method of claim 1, wherein said first and second sections of the measurement optical path include at least one at least partial back-reflection at a back-reflective surface of a different optical element interposed along the optical transport path for the laser beam or of the material being worked.

5. The method of claim 1, wherein the measurement beam is led on said common region of incidence of said optical interferometric sensor arrangement along a first direction of incidence and the reference beam is led on said common region of incidence of said optical interferometric sensor arrangement along a second direction of incidence at a predetermined angle of incidence with respect to the first direction of incidence.

6. The method of claim 1, wherein the measurement beam and the reference beam are superimposed co-linearly along a same direction of incidence towards wavelength-dispersive optical means, configured to separate frequency components of a beam obtained by superposition of the measurement beam and the reference beam on said common region of incidence of said optical interferometric sensor arrangement.

7. The method of claim 1, wherein said predetermined operating condition is a machine stand-by condition or a working condition associated with pre-established working parameters.

8. The method of claim 1, wherein the position of the pattern of interference fringes along the predetermined illumination axis is an intrinsic position of an intensity envelope of optical radiation of said pattern of interference fringes.

9. The method of claim 8, wherein the intrinsic position of the intensity envelope of optical radiation of said pattern of interference fringes is the position of peak or maximum of intensity envelope of optical radiation.

10. The method of claim 1, wherein said optical interferometric sensor arrangement comprises a linear or two-dimensional arrangement of photodetectors along said predetermined illumination axis.

11. The method of claim 1, wherein the measurement beam incident on said optical interferometric sensor arrangement comprises a main measurement beam which results from travel of a main measurement optical path with reflection from said at least one back-reflective surface of said optical element being measured and with transmission through any other optical element interposed along the optical transport path of the laser beam upstream of said optical element being measured, and at least one additional multiplexed measurement beam which results from travel of an additional measurement optical path, with reflection from said at least one back-reflective surface of said optical element being measured and having a geometric length greater than the geometric length of said main measurement optical path, which includes at least a partial back-reflection on a surface of a different optical element interposed along the optical transport path of the laser beam and of the measurement beam, the method comprising:
detecting on said common region of incidence a position of an additional pattern of interference fringes having (i) a peak or maximum of intensity of optical radiation distinct from the peak or maximum of intensity of optical radiation of a main pattern of interference fringes between the main measurement beam and the reference beam, or (ii) an intrinsic position of an intensity envelope of optical radiation offset from the intrinsic position of the intensity envelope of optical radiation of the main pattern of interference fringes; and
determining a difference in optical length between the additional measurement optical path and the reference optical path, indicative of a difference between (a) the current local position of said at least one optical element and (b) the predetermined nominal local position of said at least one optical element along the axis of the measurement beam, as a function of the position of said pattern of interference fringes along said predetermined illumination axis of said common region of incidence, or of the frequency of said pattern of interference fringes in the frequency domain, respectively.

12. The method of claim 1, wherein the reference beam incident on said optical interferometric sensor arrangement comprises a main reference beam which results from travel of a main reference optical path and at least one additional multiplexed reference beam which results from travel of an additional reference optical path having a geometric length different from the geometric length of said main reference optical path, the method comprising:
detecting on said common region of incidence a position of an additional pattern of interference fringes having (i) a peak or maximum of intensity of optical radiation distinct from the peak or maximum of intensity of optical radiation of a main pattern of interference fringes between the measurement beam and the main reference beam, or (ii) an intrinsic position of an intensity envelope of optical radiation offset from the intrinsic position of the intensity envelope of optical radiation of the main pattern of interference fringes; and
determining a difference in optical length between the measurement optical path and the additional reference optical path, indicative of a difference between (a) the current local position of said at least one optical element and (b) the predetermined nominal local position of said at least one optical element along the axis of the measurement beam, as a function of the position of said pattern of interference fringes along said predetermined illumination axis of said common region of incidence, or of the frequency of said pattern of interference fringes in the frequency domain, respectively.

13. The method of claim 1, comprising determining a position of a plurality of optical elements interposed along the optical transport path for the laser beam, the method comprising providing a plurality of measurement optical paths, associated with a corresponding plurality of reference optical paths, by extracting a corresponding plurality of measurement optical beams associated with each of said plurality of optical elements respectively, downstream of reflection or diffusion from at least one back-reflective surface of each of said plurality of optical elements, said plurality of reference optical paths being arranged to lead respective separate or superimposed reference optical beams, or being determined by a continuous variation in length of a base reference optical path through an optical element for deflection and separation of said reference optical beams.

14. The method of claim 1, comprising determining a perturbation of a current optical length of at least a portion of the measurement optical path with respect to the current optical length of a corresponding portion of the reference optical path, and correcting a determined value of the current local position of the at least one optical element along the axis of the measurement beam with respect to the nominal local position based on said perturbation,
wherein the measurement beam incident on said optical interferometric sensor arrangement comprises at least one calibration measurement beam which results from travel of a calibration measurement optical path, wherein said measurement beam is reflected or diffused by at least one back-reflective surface of a static optical element interposed along the measurement optical path, and wherein the reference beam incident on said optical interferometric sensor arrangement comprises a respective calibration reference beam which results from travel of a calibration reference optical path having an optical length equivalent to the optical length of the calibration measurement optical path in a nominal operating condition of calibration in which a geometric length and a refractive index of a transmission medium of the calibration measurement optical path are equal to the geometric length and to the refractive index of the transmission medium of the calibration reference optical path within a predetermined tolerance range,
and wherein determining the perturbation of the current optical length of at least a portion of the measurement optical path includes:
superimposing the calibration measurement beam and the calibration reference beam on the common region of incidence of said optical interferometric sensor arrangement, along the predetermined illumination axis;
detecting a position of a pattern of interference fringes between the calibration measurement beam and the calibration reference beam along said predetermined illumination axis on said common region of incidence, or a frequency of a pattern of interference fringes between the calibration measurement beam and the calibration reference beam obtained by wavelength dispersion of said calibration measurement and calibration reference beams; and
determining a difference in optical length between the calibration measurement optical path and the calibration reference optical path, indicative of a difference between (a) the geometric length of the calibration measurement optical path and the geometric length of the calibration reference optical path, and/or (b) the refractive index of the calibration measurement optical path and the refractive index of the calibration reference optical path, depending on either the position of said pattern of interference fringes along said predetermined illumination axis of said common region of incidence, or of the frequency of said pattern of interference fringes in the frequency domain,
said difference in optical length between the calibration measurement optical path and the calibration reference optical path being indicative of the perturbation of the current optical length of at least a portion of the measurement optical path.

15. The method of claim 1, comprising controlling a propagation axis of the measurement beam in a predetermined neighborhood of a propagation axis of the laser beam.

16. A machine for laser processing of a material, operating by means of a laser beam led along an optical transport path comprising at least one optical element, wherein the machine comprises a system for determining a local position of said at least one optical element, configured to carry out the method of claim 1.

17. A system for determining a local position of at least one optical element associated with an optical transport path for a laser beam in a working head of a machine for laser processing of a material, the system comprising:
means for generating a respective measurement beam of low coherence optical radiation;
means for propagating said measurement beam, configured to lead said measurement beam towards said at least one optical element, and to lead the measurement beam reflected or diffused by at least one back-reflective surface of said at least one optical element, on which said measurement beam impinges with at least a partial back-reflection, towards an optical interferometric sensor arrangement, wherein the measurement beam travels a measurement optical path from a respective source to said optical interferometric sensor arrangement including a first section between said source and said at least one back-reflective surface of said at least one optical element and a second section between said at least one back-reflective surface of said at least one optical element and the interferometric sensor arrangement, having a respective predetermined nominal geometric length when said at least one optical element is in a predetermined nominal position corresponding to a predetermined operating condition;
means for generating a respective reference beam of said low coherence optical radiation;
means for propagating said reference beam, configured to lead said reference beam towards said optical interferometric sensor arrangement, wherein the reference beam travels a reference optical path having an optical length equivalent to the optical length of the measurement optical path in a nominal operating condition in which a position of said at least one optical element is the predetermined nominal position;
wherein the means for propagating the measurement beam and the means for propagating the reference beam are configured to superimpose the measurement beam and the reference beam on a common region of incidence of said optical interferometric sensor arrangement, along a predetermined illumination axis;
means for detecting a position of a pattern of interference fringes between the measurement beam and the reference beam along said predetermined illumination axis on said common region of incidence, wherein an extension of said pattern of interference fringes along the predetermined illumination axis corresponds to a coherence length of said low coherence optical radiation, or for detecting a frequency of a pattern of fringes in a wavelength spectrum obtained from an interference between the measurement beam and the reference beam by wavelength dispersion of said measurement and reference beams, whose extension in a frequency domain is determined by the coherence length of said low coherence optical radiation; and processing means configured to determine a difference in optical length between the measurement optical path and the reference optical path, indicative of a difference between (a) a current local position of said at least one optical element and (b) the predetermined nominal local position of said at least one optical element along an axis of the measurement beam, as a function respectively of the position of said pattern of interference fringes along said predetermined illumination axis of said common region of incidence, or of the frequency of said pattern of interference fringes in the frequency domain.

* * * * *